(12) United States Patent
Richards et al.

(10) Patent No.: US 7,131,762 B2
(45) Date of Patent: *Nov. 7, 2006

(54) COLOR RENDERING OF ILLUMINATION LIGHT IN DISPLAY SYSTEMS

(75) Inventors: Peter Richards, San Francisco, CA (US); Andrew Huibers, Palo Alto, CA (US); Michel Combes, Santa Cruz, CA (US)

(73) Assignee: Texas Instruments Incorporated, Dallas, TX (US)

( * ) Notice: Subject to any disclaimer, the term of this patent is extended or adjusted under 35 U.S.C. 154(b) by 80 days.

This patent is subject to a terminal disclaimer.

(21) Appl. No.: 10/899,635

(22) Filed: Jul. 26, 2004

(65) Prior Publication Data

US 2005/0024733 A1 Feb. 3, 2005

Related U.S. Application Data (60) Provisional application No. 60/490,133, filed on Jul. 25, 2003, provisional application No. 60/490,147, filed on Jul. 25, 2003.

(51) Int. Cl.
*F21V 3/04* (2006.01)
(52) U.S. Cl. ..................................... 362/583
(58) Field of Classification Search ............... 359/891, 359/237; 353/84; 362/583; 348/743
See application file for complete search history.

(56) References Cited

U.S. PATENT DOCUMENTS

| | | | |
|---|---|---|---|
| 3,746,911 A | 7/1973 | Nathanson | |
| 4,229,732 A | 10/1980 | Hartstein | |
| 4,662,746 A | 5/1987 | Hornbeck | |
| 4,800,474 A | 1/1989 | Bornhorst | |
| 5,061,049 A | 10/1991 | Hornbeck | |
| 5,078,479 A | 1/1992 | Vuillenmier | |
| 5,103,301 A | 4/1992 | Cosentino | |
| 5,162,787 A | 11/1992 | Thompson et al. | |
| 5,216,537 A | 6/1993 | Hornbeck | |
| 5,233,385 A | 8/1993 | Sampsell | |
| 5,311,360 A | 5/1994 | Bloom | |
| 5,339,090 A | 8/1994 | Crossland et al. | |
| 5,448,314 A | 9/1995 | Heimbuch et al. | |
| 5,453,778 A | 9/1995 | Venkateswar et al. | |

(Continued)

FOREIGN PATENT DOCUMENTS

WO   WO 01/95544   6/2001

(Continued)

OTHER PUBLICATIONS

Unaxis Balzers Limited (Liechtenstein) data sheet, "1x, 2x, and 3x Speed ColorWheels (TM) for Projection, Video, and Imaging Applications", publication date unknown.

(Continued)

*Primary Examiner*—Hung Xuan Dang
(74) *Attorney, Agent, or Firm*—W. James Brady, III; Frederick J. Telecky, Jr.

(57) ABSTRACT

A method and apparatus for compensating for deficiency in the illumination light from a light source is provided, where the spectrum in the visible range of light from the light source is determined, and a deficiency at a wavelength or band of wavelengths in the visible range of light is determined therefrom, a color sequencing device is provided having a set of filters comprising red, green and blue filter segments, and an additional color balancing filter segment, and wherein a the color balancing segment is constructed so as to preferentially pass a band or bands of wavelengths, which band or bands are determined based on the determined deficiency of the light source.

35 Claims, 8 Drawing Sheets

U.S. PATENT DOCUMENTS

| | | |
|---|---|---|
| 5,504,504 A | 4/1996 | Markandey et al. |
| 5,526,172 A | 6/1996 | Kanack |
| 5,535,047 A | 7/1996 | Hornbeck |
| 5,589,852 A | 12/1996 | Thompson et al. |
| 5,592,188 A | 1/1997 | Doherty et al. |
| 5,608,468 A | 3/1997 | Gove |
| 5,612,753 A | 3/1997 | Poradish et al. |
| 5,629,794 A | 5/1997 | Magel et al. |
| 5,650,832 A | 7/1997 | Poradish et al. |
| 5,661,591 A | 8/1997 | Lin et al. |
| 5,668,572 A | 9/1997 | Meyer et al. |
| 5,680,180 A | 10/1997 | Huang |
| 5,696,619 A | 12/1997 | Knipe et al. |
| 5,754,217 A | 5/1998 | Allen |
| 5,777,694 A | 7/1998 | Poradish |
| 5,784,038 A | 7/1998 | Irwin |
| 5,805,243 A | 9/1998 | Hatano et al. |
| 5,835,256 A | 11/1998 | Huibers |
| 5,863,125 A | 1/1999 | Doany |
| 5,977,940 A | 11/1999 | Akiyama et al. |
| 6,054,832 A | 4/2000 | Kunzman et al. |
| 6,107,980 A | 8/2000 | Hermanns et al. |
| 6,108,053 A | 8/2000 | Pettitt et al. |
| 6,147,720 A | 11/2000 | Guerinot et al. |
| 6,324,006 B1 | 11/2001 | Morgan |
| 6,334,685 B1 | 1/2002 | Slobodin |
| 6,388,661 B1 | 5/2002 | Richards |
| 6,392,717 B1 | 5/2002 | Kunzman |
| 6,445,505 B1 | 9/2002 | Morgan |
| 6,461,001 B1 | 10/2002 | Okamori et al. |
| 6,536,904 B1 | 3/2003 | Kunzman |
| 6,567,134 B1 | 5/2003 | Morgan |
| 6,623,144 B1 | 9/2003 | Bornhorst |
| 6,642,969 B1 | 11/2003 | Tew |
| 2001/0008470 A1 | 7/2001 | Dewald |
| 2002/0054031 A1 | 5/2002 | Elliot et al. |
| 2002/0105729 A1 | 8/2002 | Richards et al. |
| 2002/0135862 A1 | 9/2002 | Dewald |
| 2003/0099108 A1 | 5/2003 | Slobodin |
| 2003/0123120 A1 | 7/2003 | Hewlett et al. |
| 2003/0197834 A1 | 10/2003 | Kang |
| 2003/0198050 A1 | 10/2003 | Yamazaki |
| 2003/0227465 A1 | 12/2003 | Morgan et al. |
| 2004/0070736 A1 | 4/2004 | Roddy et al. |
| 2005/0024734 A1* | 2/2005 | Richards et al. ............ 359/634 |

FOREIGN PATENT DOCUMENTS

| | | |
|---|---|---|
| WO | WO 02/099776 | 6/2002 |
| WO | WO 02/101644 | 6/2002 |
| WO | WO 03/007074 | 7/2002 |
| WO | WO 03/088203 | 4/2003 |
| WO | WO 2004/010407 | 7/2003 |

OTHER PUBLICATIONS

Dewald, et al., "Sequential Color Recapture and Dynamic Filtering" SID 01 Digest, pp. 1076-1079.

Jeffrey Shimizu, "Invited Paper: Scrolling Color LCOS for HDTV Rear Projection" SID 01 Digest, pp. 1072-1075.

Walter, et al., "Pulse-Length Modulation Achieves Two-Phase Writing in Matrix-Addressed Ligquid-Crystal Information Displays", 1978 IEEE, pp. 98-100.

* cited by examiner

COLOR RENDERING OF ILLUMINATION LIGHT IN DISPLAY SYSTEMS

CROSS-REFERENCE TO RELATED APPLICATIONS

The present application claims priority under 35 USC §119(e) section 1 from U.S. provisional applications, Ser. No. 60/490,133, and Ser. No. 60/490,147, both to Richards et al and filed on Jul. 25, 2003, the subject matter of each being incorporated herein by reference.

BACKGROUND OF THE INVENTION

In current display systems employing spatial light modulators, light sources and color filters are used to produce primary colors for the display systems. The light source often comprises an arc lamp emitting light of white color. The color filter, such as a spinning color wheel having primary color segments separates the white color light from the light source into primary colors. The primary colors then sequentially illuminate pixels of the spatial light modulator so as to be modulated according to date of desired images.

The primary color light from such light source and color filter, especially when the color filter has only primary color segments, however, has many deficiencies in color and/or in optical efficiencies, such as poor brightness. The quality of the displayed images is thus degraded. Moreover, the light source, such as the arc lamp generally exhibits non-uniform illumination spectrum—that is the illumination intensity, as well as the perceived illumination intensity by viewer's eyes varies over the wavelength in the visible light range. This non-uniform spectrum, if passing through the color filter of primary color segments only may distort the colors derived from combinations of the primary colors from the color filter.

For correcting the deficiencies of the illumination light onto the spatial light modulator and the imbalance in the illumination light from the light source, number of attempts has been made. For example, the lengths of the color segments in the color filter can be made unequal according to the spectral properties of the color filter. Some color segments can be made longer than others so as to "boost" wavelengths that are deficient in the light from the light source. Many of these approaches, however, have disadvantages or are not efficient. For example, the whiteness of the white color generated from the primary colors after the light source and color filter is often shifted away from the desired whiteness. Specifically, the temperature of the white color is moved from where it should be. Some approaches have addressed this off-white problem and move the white color generated by the additional color segment towards the white color generated by the primary segments of the color filter, as illustrated in FIG. 1 and FIG. 2.

Figure 1:
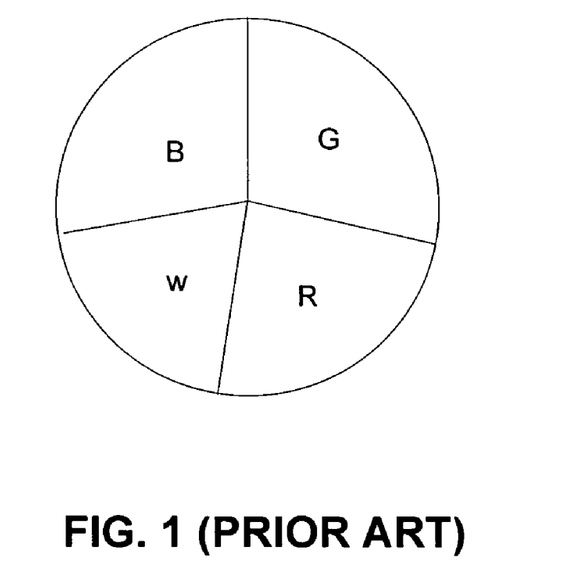
FIG. 1 illustrates a typical color wheel in the art.

FIG. 1 is a typical color wheel in the art for use in digital display systems. The color wheel has primary color segments red (R), green (G), and blue (B); and a white boosting segment W. The W segment can be a clear (white) segment or has a color for compensating the white color produced by the R, G, and B segments. A way of compensating the color using the white boosting segment is demonstrated in FIG. 2. A primary color is such a color that at least one color in the color space of the displayed images can not be properly produced without the primary color. In other words, a primary color is a mandatory color to produce other colors of color images.

Figure 2:
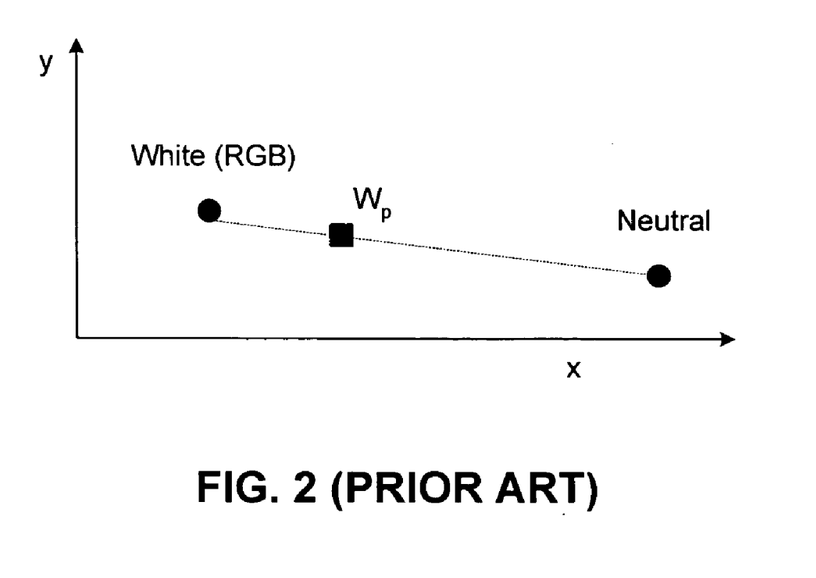
FIG. 2 demonstrates the effect of white boosting using the color wheel in FIG. 1.

Referring to FIG. 2, the white color generate by the primary color segments (RGB in FIG. 1) is represented by White (RGB) in the Commission International d'Eclairage 1931 chromaticity chart (hereafter CIE chromaticity chart). For boosting the brightness (whiteness) of the generated white (RGB), the white boosting segment is added to the color filter. The white boosting segment has a color represented by the Neutral point that is generally away from the white (RGB). The combination color $W_p$ of the white boosting segment and the primary color segments RGB lies between the white (RGB) and neutral and in the line connecting the two. This method moves the generated white color toward the white by RGB, thus decreasing the discrepancy between the white color generated by the white boosting segment and the white generated by the RGB. However, this method naturally decreases the control range of the white color for different light sources. That is, this method does not allow for the white color control in the full white range from hot white (e.g. of an arc lamp) to cold white.

Another disadvantage of the color wheel in the art is that when different light sources are used, modulation methods, such as the pulse-width-modulation algorithms will need to be modified, which certainly degrades compatibility of the color wheels to light sources.

Therefore, a method and apparatus for compensating the color of the illumination light with the impact on the brightness of the illumination light minimized are desired.

SUMMARY OF THE INVENTION

Objects and advantages will be obvious and will, in part, appear hereinafter and will be accomplished by the present invention that provides a method and device for compensating the color of the illumination light with the impact on the brightness of the illumination light being minimized. For the given primary colors of the color wheel and modulation algorithm (e.g. the pulse-width-modulation algorithm), color compensations for different light sources can be achieved by simply adjusting the color of the color rendering segment of the color wheel.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE EMBODIMENTS

To correct deficiencies in the illumination light, a color rendering filter, such as a color rendering segment in a color wheel is added to a set of primary colors.

As an aspect of the invention, the color rendering filter has a color whose chromaticity may lie within a triangle zone, the triangle zone having a set of corner points defined by the chromaticity coordinates of the red, green, and blue primary colors, but outside a white zone having corners with chromaticity coordinates (0.355, 0.355); (0.305, 0.305); (0.285, 0.325); and (0.335, 0.375).

As another aspect of the invention, the color rendering filter has a color that may lie within a sector between radial lines $NC_1$ and $NC_2$ in a chromaticity diagram but outside a white zone having corners with coordinates (0.355, 0.355); (0.305, 0.305); (0.285, 0.325); and (0.335, 0.375), and with exclusion of colors belonging to a zone having corners with chromaticity coordinates of (0.368, 0.539), (0.421, 0.486), (0.460, 0.540); and (0.387, 0.610), wherein N is the color of light from the light source; and $C_1$ corresponds to a color of a monochromatic light source having a wavelength of 610 nanometers, while $C_2$ corresponds to another color of a monochromatic light source having a wavelength of 546 nanometers.

As yet another aspect of the invention, the color rendering filter has a color that may lie within a sector between radial lines $NA_1$ and $NA_2$ in a chromaticity diagram but outside a white zone having corners with coordinates (0.355, 0.355); (0.305, 0.305); (0.285, 0.325); and (0.335, 0.375), and with exclusion of a zone having corner points with chromaticity coordinates of (0.15, 0.22), (0.21, 0.16), (0.286, 0.446), (0.166, 0.364), and (0.15, 0.22), wherein N is the color of light from the light source; and $A_1$ and $A_2$ have the chromaticity coordinates of (0.373, 0.624) and (0.169, 0.007), respectively.

As yet another aspect of the invention, an illumination system for use in a projection system is disclosed. The illumination system comprises: a light source producing light; a set of primary color filters producing a number of N primary colors; and a color rendering filter having a non-primary color that is different from the N primary colors, wherein said non-primary color is not white.

As yet another embodiment of the invention, an illumination system for use in a display system is disclosed. The illumination system comprises: a light source producing light; a color wheel, further comprising: a set of primary color segments producing primary colors of red, green, and blue; and a color rendering segment, wherein the color rendering segment has a color that is determined based upon a product function that is proportional to a product of the luminance sensitivity of a viewer's eyes, a spectrum of the light from the light source and a predetermined wavelength threshold of the product function.

As yet another aspect of the invention, a method of rendering a sequence of primary color beams shining on an array of pixels of a spatial light modulator of a display system is disclosed. The method comprises: determining a first white color produced by the sequence of primary colors; and adding an additional color component into the sequence of primary color beams, wherein the additional color component has a color such that the first white color is spaced as far away from a second white color within a white zone in a chromaticity diagram, wherein the white zone has corner points with chromaticity coordinates of (0.355, 0.355); (0.305, 0.305); (0.285, 0.325); and (0.335, 0.375); and wherein the second white color is a color produced by the primary colors and the additional color component.

The present invention can be implemented in many color illumination devices, such as illumination systems using different light source and different color splitting device. Exemplary light sources are arc lamps, LEDs, or other type of solid state devices, and the light splitting devices can be color wheels or other type of devices such as spinning prisms. The illumination system may comprise other desired components, such as light integrates for collecting light emanated from the light source and delivering the collected light to other devices, such as the color filters. The spatial light modulator can be a liquid crystal array (LCD or LCOS) or a micromirror array, such as set forth in U.S. Pat. No. 6,046,840 to Huibers or U.S. Pat. No. 6,523,961 to Ilkov et al. (which spatial light modulator can be addressed such as set forth in U.S. Pat. No. 6,388,661 to Richards)—each of these patents being incorporated herein by reference.

In the following, the invention will be described with reference to particular examples of color wheel. It will be appreciated by those skilled in the art that the following discussion are for demonstration purposes only, and should not be interpreted as a limitation. Other variations without departing from the spirit of the invention are also applicable.

Figure 3:
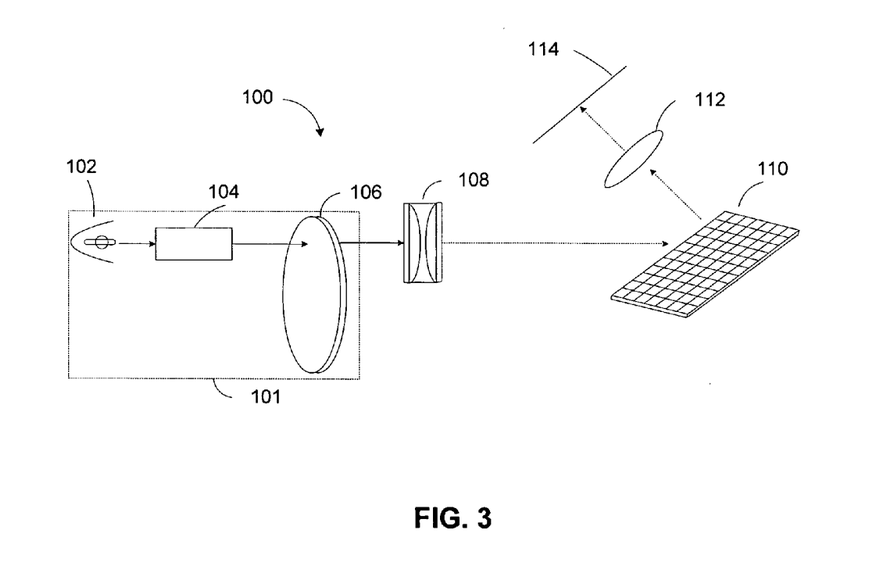
FIG. 3 illustrates an exemplary display system having a color wheel in which embodiments of the invention can be implemented.

Turning to the drawings, FIG. 3 illustrates an exemplary display system having a color wheel in which embodiments of the invention can be implemented. In its basic configuration, display system 100 comprises illumination system 101, optical elements 108 and 112, spatial light modulator 110, and display target 114. Illumination system 101 comprises light source 102, which can be an arc lamp, lightpipe 104 that can be any suitable integrator of light or light beam shape changer, and colour filter 106, which can be a color wheel.

Figure 4:
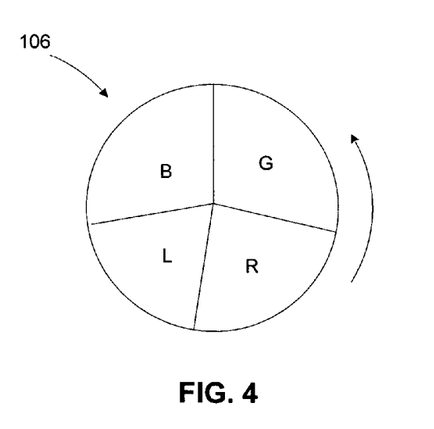
FIG. 4 illustrates an exemplary color wheel having a color rendering segment according to the invention.

An exemplary color wheel according to the invention is illustrated in FIG. 4. Color wheel 106 in this particular example comprises three primary color segments R, G, B, and a color rendering segment L. The primary color segments R, G, and B each passes light of a particular color. Specifically, the red, green, and blue segments respectively pass red, green, and blue color light. Alternatively, the primary colors can be yellow, cyan, and magenta, or a combination of red, green, red, yellow, cyan, and magenta. In other embodiments of the invention, the color wheel may comprise multiple segments with more than one segments corresponding to a primary color. For example, a color wheel may comprise R-G-B-L, or R-G-B-R-G-B-L, or R-G-B-L-R-G-B-L, or other type of configurations. Another exemplary color wheel having more than three segments is as set forth in U.S. patent application Ser. No. 10/771,231 to Huibers, filed on Feb. 3, 2004 the subject matter being incorporated herein by reference. Regardless of the different number of segments a color wheel may have, at least one of the segments is a color rendering segment, and a set of segments are primary color segments.

The color wheel is provided for separating light from the light source into designated primary colors. Such separated primary colors are then sequentially directed to the reflecting surfaces of the pixels in the spatial light modulator from which the primary colors are reflected either onto or away from the display target according to the data of desired images so as to generate the desired images. The amount (e.g. the luminance) of the individual primary colors in the light emanated from the light source, which is often referred to as the spectrum of the light of the light source, however, is non-uniform in most of the current light sources available for display systems. An exemplary spectrum of an arc lamp which is a typical light source in display systems employing spatial light modulators is illustrated as the line curve in FIG. 8.

Figure 8:
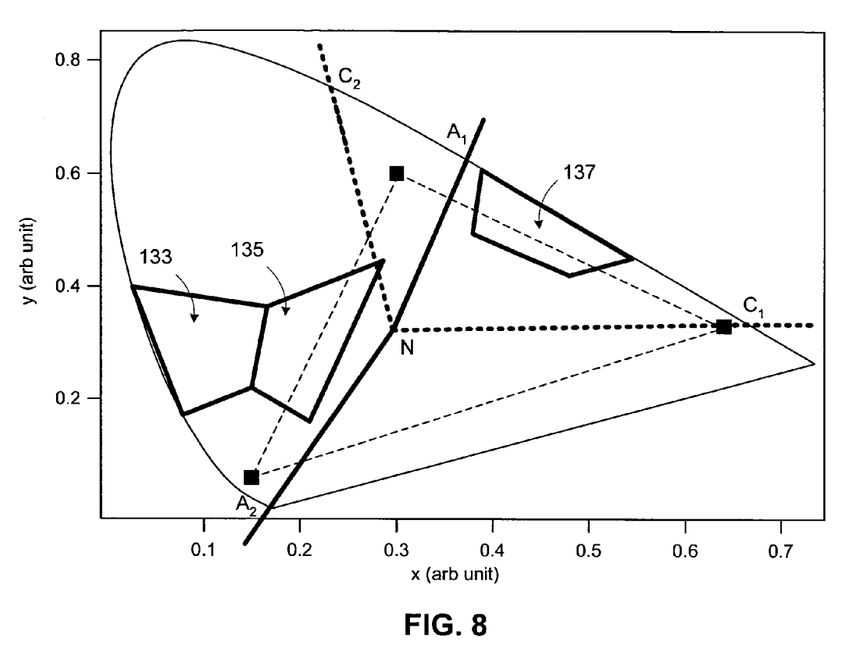
FIG. 8 illustrates in the CIE 1931 chromaticity chart a set of zones from which the color of the color rendering filter in FIG. 4 can be selected according to yet another embodiment of the invention.

It can be seen in FIG. 8 that, different colors of different wavelengths have different intensities. In particular, peaks for the blue colors (near 440 nm in wavelength), green colors (near 550 nm in wavelength), and red colors (near 570 nm in wavelength) are different. If the color wheel has equal segments of red, green and blue, the white color produced by the primary color segments R, G, and B will be different from the white color of the light from the light source. In a chromaticity diagram, such as the CIE 1931 chromaticity chart, the white point produced by the R, G, and B color segments (hereafter, White (RGB)) is at a different location than the white point produced by the light emanated form the light source (hereafter, Neutral point), which will be discussed in detail with reference to FIGS. 5A and 5B. This phenomenon is referred to as off-white.

To correct this off-white, a color rendering filter L is added in the color wheel as shown in FIG. 4. Unlike that in the art wherein the off-white is corrected by changing the relative sizes of the segments in the color wheel, color segments of the color wheel in the present invention can be made equal. Specifically, each of the four segments can be 90° degrees. Alternatively, the segments of the color wheel may have different sizes, though less preferred.

According to the invention, the color rendering segment of the color wheel has a color that is neither white nor any of the selected primary colors of the primary color segments in the color wheel. In accordance with an embodiment of the invention, the color rendering filter has a color whose chromaticity lies within a triangle zone in a chromaticity diagram, such as the CIE 1931 chromaticity chart and is not white, as shown in FIG. 5A.

Figure 5A:
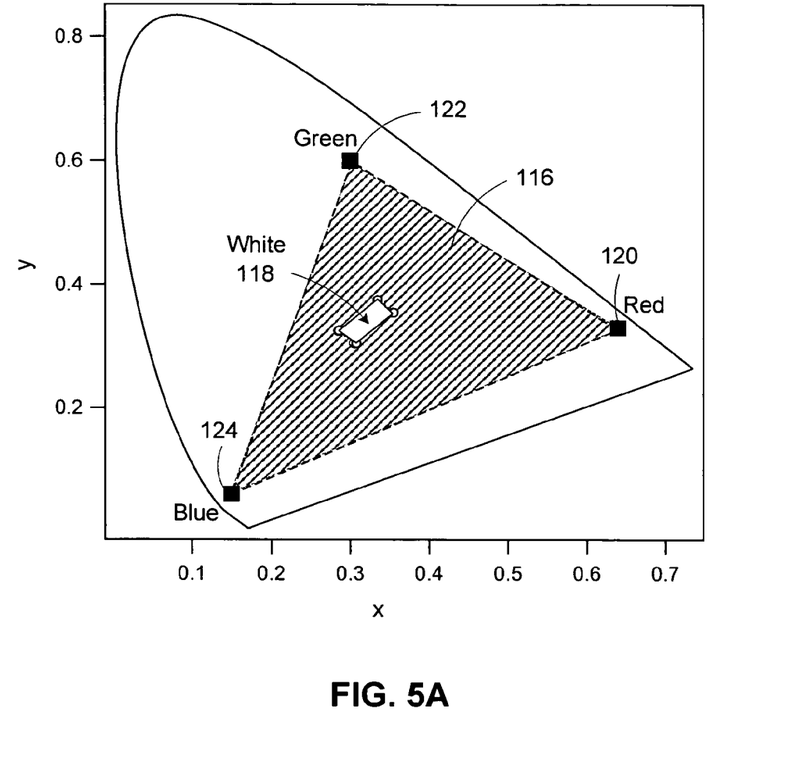
FIG. 5A illustrates in the CIE chromaticity 1931 chart a zone from which the color of the color rendering segment of the color filter can be selected according to an embodiment of the invention.

Referring to FIG. 5A, a chromaticity diagram, such as the CIE 1931 chart plots representing hue and saturation of different colors is illustrated therein. Fully saturated hues lie along the outside edge with desaturated colors toward the center of the chart. Red, Green, and Blue points 120, 122 and 124 in the chart are pre-selected red, green, and blue primary colors of the R, G, and B segments respectively in the color wheel in FIG. 4. Triangle 116 spanned by the Red, Green, and Blue points defines all possible colors that can be produced by combinations of the R, G, and B primary color segments in the color wheel. Rectangular white zone 118 within the triangle as shown in the figure comprises defines the white colors. The chromaticity coordinates of the corner points of the white zone can be (0.355, 0.355); (0.305, 0.305); (0.285, 0.325); and (0.335, 0.375) in the chromaticity diagram.

In accordance with an embodiment of the invention, the color rendering segment L of the color wheel (e.g. the color wheel in FIG. 4) has a color whose chromaticity coordinates lie within triangle 116 but outside the white zone, as represented by the shaded area.

For a given light source and the primary colors of the primary color segments of a color wheel, the color of the color rendering segment of the color wheel can be selected in many ways so as to compensate the deficiencies of the light from the light source. An exemplary method of determining the color of the color rendering segment is demonstrated in FIG. 5B.

Figure 5B:
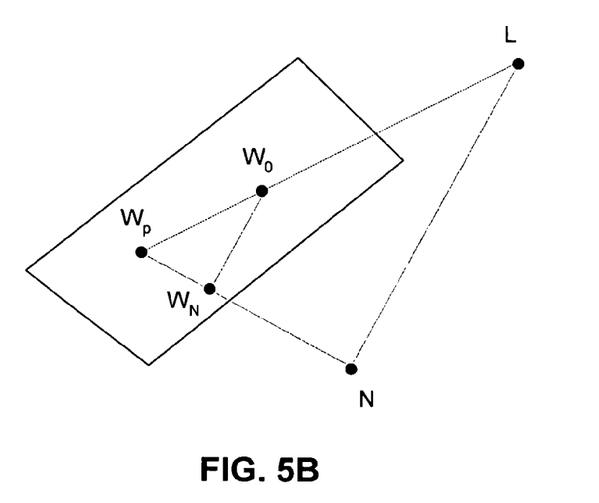
FIG. 5B is an exploded diagram of a portion of FIG. 5A to demonstratively illustrate an exemplary method of selecting a color for the color rendering filter in FIG. 4 according to an embodiment of the invention.

Referring to FIG. 5B, $W_p$ represents the white color produced by the given R, G, and B primary color segments of the color wheel. As mentioned earlier, the R, G, and B primary color segments may or may not be the standard red, green, and blue colors. Instead, they can be yellow, cyan, and magenta, respectively. Point N is the color of the light emanated from the light source, which is often referred to as the neutral color. Point N can also be the color produced by passing the light from the light source through a clear color wheel (or a clear segment of a color wheel). Point N may have the highest possible brightness that can be achieved by the illumination system, which including the light source and the color wheel. Point $W_N$ is the color yield by the combination of the neutral point and the $W_p$. $W_o$ is the desired white color, and it can locate at any position within the rectangular white color zone. In fact, any white color point within the rectangular white zone can be achieved with impact on the efficiency minimized in the present invention, allowing for significant control range of the white colors. For example, a white color in the direction towards the cyan tone can be designated as the desired white color when a cold light source (e.g. an arc lamp) is used. When a hot light source, a white point in the direction towards the yellowish tone can be designated as the desired whiter color. For accommodating different light sources of a family usable for display systems having spatial light modulators, the desired white color can be made as far away from $W_p$ as the white rectangular zone allowing. In this way, both of high and low temperature white colors can be achieved without compromising skin-tones that require low temperature white.

Given points $W_p$, N, and $W_o$, point L as the color of the color rendering segment of the color wheel in the presence of the particular light source can be determined by drawing a line parallel to the line connecting points $W_o$ and $W_n$, and the intersection of such drawn line and the line connecting points $W_p$ and $W_o$ is the point L. Point L is such as color that a mixture of L and $W_p$ is the desired white color $W_o$. In other words, the desired white color $W_o$ can be achieved by passing the light emanated from the light source through a spinning color wheel having the R, G, and B segments, and the color rendering segment of color L. In the above example, point L is outside the white rectangular zone, but still within the triangle spanned by points Red, Green, and Blue in the CIE chart. Such achieved white color $W_o$ may have a temperature of 7000K or higher, but without losing the brightness. The above discussed exemplary method of determining color L for the color rendering segment can be mathematically described as follows.

Assuming the color wheel having equal-segments of R, G, and B, and a color rendering segment L with size of k×360° degrees, wherein k is a scaling factor, the energy of the desired white point can thus be expressed as:

$$E_W = k \times (E_R + E_G + E_B) + (1-k)\left(\frac{E_R}{r_0} + \frac{E_G}{g_0} + \frac{E_B}{b_0}\right) \quad \text{(Eq. 1)}$$

wherein $$\frac{1}{r_0}, \frac{1}{g_0}, \frac{1}{b_0}$$

are scaling factors having a property of $$\frac{1}{r_0} + \frac{1}{g_0} + \frac{1}{b_0} = 1;$$

and wherein the total energy of the illumination system including the light source and the color wheel is $E_R+E_G+E_B$. To achieve an equal-energy white point, the color of the color rendering segment can be selected such that the following equations are satisfied:

$$\left(k + \frac{1-k}{r_0}\right) \times E_R = \left(k + \frac{1-k}{g_0}\right) \times E_G = \left(k + \frac{1-k}{b_0}\right) \times E_B, \quad \text{(Eq. 2)}$$

and color L is then defined by $$\left(\frac{1}{r_0}, \frac{1}{g_0}, \frac{1}{b_0}\right).$$

In the above embodiment of the invention as shown in FIG. 5A, the color of the color rendering segment of the color wheel are determined with given primary colors of red, green, and blue of the primary color segments R, G, and B. As an aspect of the embodiment, the primary colors of red, green, and blue each can be selected from certain zones in the chromaticity diagram, as shown in FIG. 6.

Figure 6:
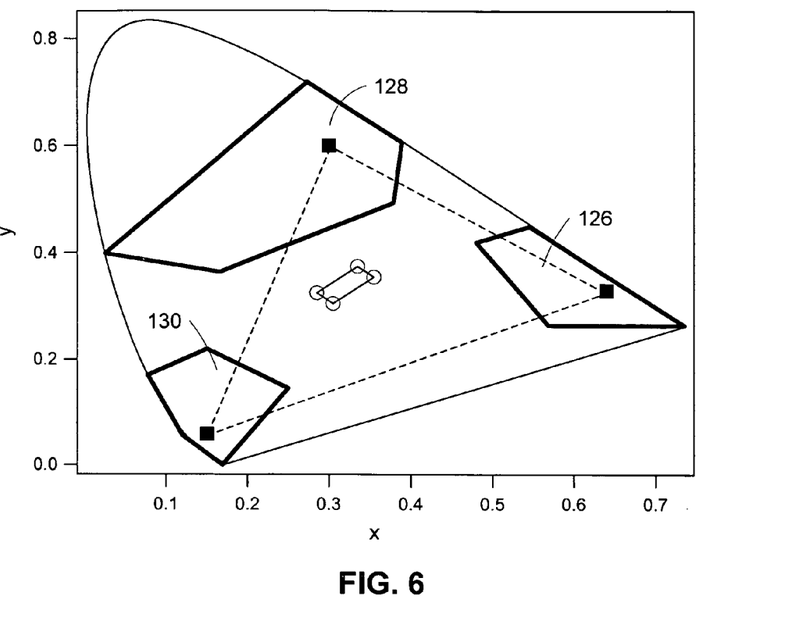
FIG. 6 illustrates in the CIE 1931 chromaticity chart a set of zones from which the color of the color rendering filter in FIG. 4 can be selected according to yet another embodiment of the invention.

Referring to FIG. 6, red, green, and blue primary colors for the R, G, and B primary color segments in the color wheel can be respectively selected from zone 126, zone 128, and zone 130. In the chromaticity diagram, such as the CIE 1931 chromaticity chart, coordinates of the corner points of zone 126 can be (0.48, 0.42), (0.568, 0.265), (0.735, 0.265), (0.545, 0.45), and (0.48, 0.42). Coordinates of the corner points of zone 128 can be (0.026, 0.399), (0.166, 0.364), (0.379, 0.494), (0.389, 0.607), (0.273, 0.719), and (0.026, 0.399); while coordinates of the corner points of zone 130 can be (0.078, 0.171), (0.15, 0.22), (0.25, 0.146), (0.169, 0.002), (0.12, 0.058), and (0.078, 0.171).

As a way of example, the red, green, and blue may have the chromaticity coordinates of (0.355, 0.355); (0.305, 0.305); (0.285, 0.325), respectively. In other embodiments, the colors of the primary color segments in the color wheel can be defined according to other standards, such as those listed in table 1.

TABLE 1

| | (Primary Color Chromaticity) | | | | | |
|---|---|---|---|---|---|---|
| | Red | | Green | | Blue | |
| | x | y | x | y | x | y |
| NTSC | 0.67 | 0.33 | 0.21 | 0.71 | 0.14 | 0.08 |
| PAL/SECAM | 0.64 | 0.33 | 0.29 | 0.6 | 0.15 | 0.06 |
| SMPTE | 0.63 | 0.34 | 0.31 | 0.595 | 0.155 | 0.07 |

In operation, the parameters $r_o$, $g_o$, and $b_o$ for the color of the color rendering segment can be represented (stored) in a number of bits. For example, $r_o$, $g_o$, and $b_o$ can be represented by a total of N bits (e.g. 8 bits) with I bits (e.g. 1, 2, or 3 bits) representing the integer portion and (N−I) bits (e.g. 7, 6 or 5 bits) representing the fraction portion. As a result, the color of the color rendering segment lies within a hexagon in the triangle, as shown in FIG. 7.

Figure 7:
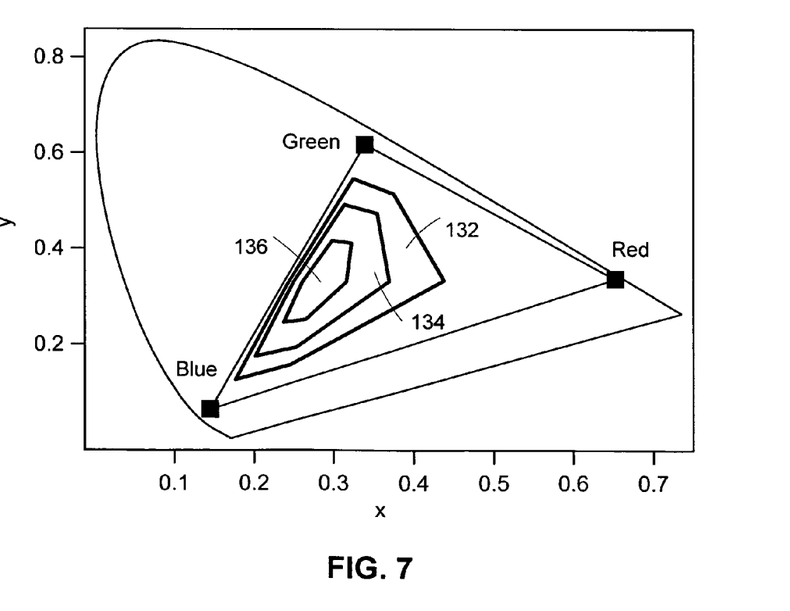
FIG. 7 illustrates in the CIE 1931 chromaticity chart a set of zones from which the color of the color rendering filter in FIG. 4 can be selected according to yet another embodiment of the invention.

Referring to FIG. 7, hexagons 136, 134, and 132 illustrate zones in which the color of the color rendering segment lies, wherein the color of the color rendering segment is respectively represented by schemes of 1 bit for the integer portion, 2-bit for the integer portion, and 3 bits for the integer portion. The coordinates of the corner points of the hexagons can be: for hexagon 132: (0.298325, 0.416723), (0.322331, 0.411286), (0.31584, 0.330995), (0.264958, 0.251902), (0.237505, 0.245913), (0.260487, 0.330094), and (0.298325, 0.416723); for hexagon 134: (0.313598, 0.492167), (0.354243, 0.473501), (0.369185, 0.331862), (0.253236, 0.193999), (0.201389, 0.175504), (0.249443, 0.329915), (0.313598, 0.492167); and for hexagon 136: (0.324499, 0.546016), (0.374922, 0.513816), (0.437375, 0.332971), (0.245864, 0.157584), (0.176564, 0.127107), (0.243684, 0.329821), (0.324499, 0.546016). In particular, the color rendering segment may have a color whose chromaticity coordinates lie within a hexagon $G_2Y_2R_2M_2B_2Q_2$ for 2-bits, wherein $G_2$ is the color produced by the white light from the light source shining through 100% of the green segment, 25% of the Red segment, and 25% of the Blue segment; wherein $Y_2$ is the color produced by the white light from the light source shining through 100%, 25% and 25% of the Green, the Red, and the Blue segment, respectively; wherein $R_2$ is the color produced by the white light from the light source shining through 25%, 100%, and 25% of the Green, the Red, and the Blue segment, respectively; wherein $M_2$ is the color produced by the white light from the light source shining through 25%, 100%, and 100% of the Green, the Red, and the Blue segment, respectively; wherein $B_2$ is the color produced by the white light from the light source shining through 25%, 25%, and 100% of the Green, the Red, and the Blue segment, respectively; and wherein $Q_2$ is the color produced by the white light from the light source shining through 100%, 25%, and 100% of the Green, the Red, and the Blue segment, respectively.

As another aspect of the embodiment as discussed with reference to FIGS. 5A and 5B, the color rendering segment of the color wheel has a color whose chromaticity coordinates in a chromaticity diagram, such as the CIE chart lie within a triangle zone YNO, wherein N is a color of the light from the light source; wherein Y is a color produced by the light from the light source passing through 100% and 80% of the green and red filter, respectively; and wherein O is the color produced by the light from the light source passing through the 90% of the green segment and 100% of the red segment. Specifically, point N has chromaticity coordinates of (0.296, 0.322) in the CIE chromaticity chart.

As yet another aspect of the embodiment of the invention, the color rendering segment has a color whose chromaticity coordinates lie within a triangle zone of NCA in a chromaticity diagram, such as the CIE chromaticity chart, wherein N is a color of the light from the light source; wherein C is a color produced by the color from the light source passing 100%, 60%, and 0% of the green, blue, and red segment, respectively; and wherein A is a color produced by passing the light from the light source through 92% of the green segment and 100% of the blue segment. Specifically, point N has chromaticity coordinates of (0.296, 0.322) in the CIE chromaticity chart.

In accordance with another embodiment of the invention, the color for the color rendering segment of the color wheel has chromaticity coordinates lie within sector between lines $NC_1$ and $NC_2$ in a chromaticity diagram but is not white (e.g. outside white zone 118 in FIG. 5A) and with exclusion of the primary colors of Red, Green, and Blue of the primary color segments of the color wheel, and with exclusion of a particular zone (e.g. zone 137), as shown in FIG. 8.

Referring to FIG. 8, point N is the neutral color. $C_1$ and $C_2$, are intersects of the CIE curve to the lines $NC_1$, $NC_2$, respectively. $C_1$ corresponds to a color of light from a monochromatic light source with a wavelength of 610 nanometers, while $C_2$ corresponds to another color of light from another monochromatic light source with a wavelength of 546 nanometers. Zone 137 has corner points with chromaticity coordinates of (0.368, 0.539), (0.421, 0.486), (0.46, 0.54), (0.387, 0.61), and (0.368, 0.539). In accordance with the embodiment of the invention, the color rendering segment of the color wheel has a color whose chromaticity coordinates lie within the section between lines $NC_1$ and $NC_2$ (the section containing wavelengths between 546 nm and 610 nm) but outside the white zone (e.g. white zone 118 in FIG. 5A) and with exclusion of zone 137.

In the chromaticity diagram, the $C_1$ and $C_2$ points may have chromaticity coordinates of (0.666, 0.334) and (0.237, 0.718), respectively. And point N may have the chromaticity coordinates of (0.296, 0.322). The color of the color rendering segment can be represented by chromaticity coordinates of (x, y), which satisfy the following equations:

$y>0.0313 \cdot x+0.313$ AND $y<-17.096 \cdot x+5.384$, and $(x,y) \in$ white zone and yellow zone.

Figure 9:
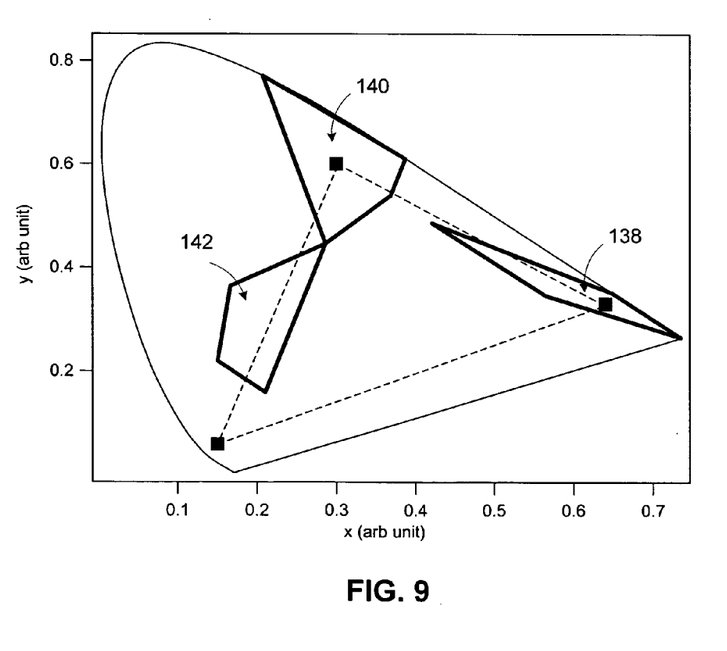
FIG. 9 illustrates in the CIE 1931 chromaticity chart a set of zones from which the color of the color rendering filter in FIG. 4 can be selected according to yet another embodiment of the invention.

As an aspect of the invention, the color of the color rendering segment may lie within zone 138 with the corner points having the chromaticity coordinates of (0.565, 0.346), (0.735, 0.265), (0.648, 0.351), and (0.421, 0.486) in as shown in FIG. 9. As yet another aspect of the invention, the color of the color rendering segment may lie within zone 140 with the corner points having the chromaticity coordinates of (0.286, 0.446), (0.207, 0.771), (0.368, 0.539), and (0.387, 0.610), as shown in FIG. 9.

In accordance with yet another embodiment of the invention, the color rendering segment of the color wheel has a color whose chromaticity lies within a sector between lines $NA_1$ and $NA_2$ in a chromaticity diagram but is not white (e.g. outside white zone 118 in FIG. 5A) and with exclusion of the primary colors of Red, Green, and Blue of the primary color segments of the color wheel, and with exclusion of a particular zone, as shown in FIG. 8.

Referring back to FIG. 8, $A_1$, and $A_2$ are intersects of the chromaticity curve to the lines $NA_1$ and $NA_2$, respectively. $A_1$ corresponds to a color of light from a monochromatic light source with a wavelength of 560 nanometers, while $A_2$ corresponds to another color of light from another monochromatic light source with a wavelength of 430 nanometers. Particular zone 135 has the corner points with chromaticity coordinate of (0.15, 0.22), (0.21, 0.16), (0.286, 0.446), (0.166, 0.364), and (0.15, 0.22). And zone 133 has the corner points with chromaticity coordinates of (0.399, 0.026), (0.399, 0.026), (0.171, 0.078), (0.22, 0.15), (0.364, 0.166), and (0.399, 0.026). $A_1$ and $A_2$ have the chromaticity coordinates of (0.373, 0.624) and (0.169, 0.007), respectively. In the chromaticity chart, the color of the color rendering segment can be represented by chromaticity coordinates of (x, y), which satisfy the following equations:

$y>3.922 \cdot x-0.839$ AND $y>2.48 \cdot x-0.412$ and $(x,y) \in$ white zone and sub-cyan zone.

As an aspect of the embodiment of the invention, the color rendering segment may have a color whose chromaticity is neither within zone 133 nor zone 135. As another aspect of the invention, the color of the color rendering segment is not in zone 133 or zone 135.

In accordance with yet another embodiment of the invention, the color wheel comprises a set of primary color filters producing a number of N primary colors; and a color rendering filter having a non-primary color that is different from the N primary colors, wherein said non-primary color is not white. For example, the primary colors may comprise red, green, and blue primary colors, or yellow, cyan, and magenta, or a combination of red, green, blue, yellow, cyan, and magenta. The color of the color rendering segment is not white—meaning the color is outside the white zone having corner points with chromaticity coordinates of (0.355, 0.355); (0.305, 0.305); (0.285, 0.325); and (0.335, 0.375) in a chromaticity diagram such as the CIE 1931 chart.

In the embodiments of the invention discussed above, selections of the color for the color rendering segment of the color wheel depends from the primary color segments R, G, and B of the color wheel. Color selection for the color rendering segment in the color wheel can alternatively be made according to the spectrum of the light emanated from the light source and the perceptivity of viewer's eyes, but not to particular color definitions for the primary color segments in the color wheel. Specifically, the color of the color rendering segment is selected based on the product of the spectrum and the perceptivity, which will be discussed in detail with reference to FIGS. 10 and 11.

Figure 10:
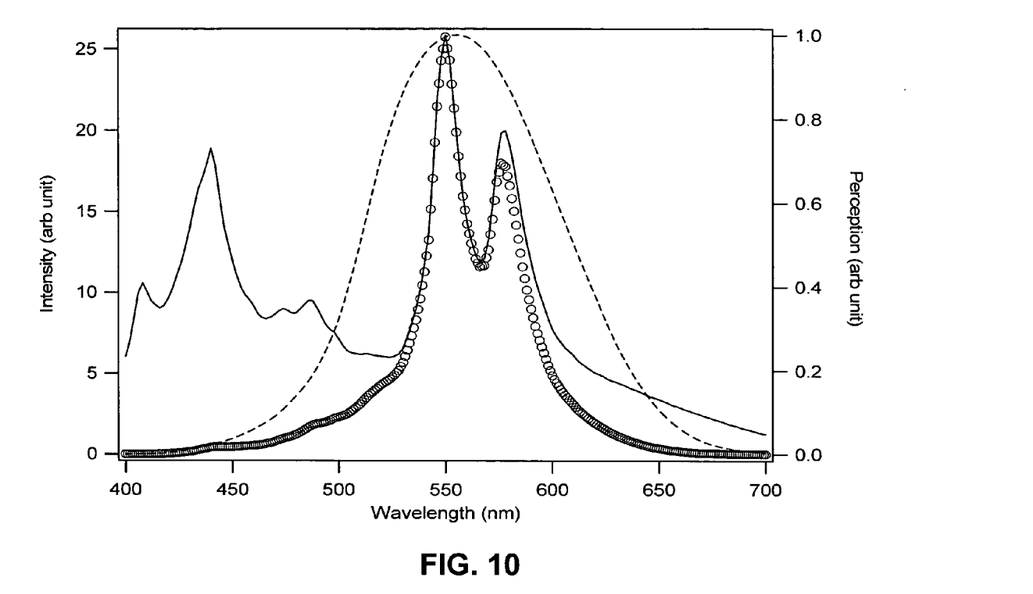
FIG. 10 demonstratively plots a spectrum of light emanated from a light source and a typical sensitivity of a viewer's eyes across the wavelength in the visible light range.

Referring to FIG. 10, intensity of light from an exemplary light source is plotted over wavelength within a range from 400 to 700 nm (the visible light range), as represented by the continuous line curve. For most light sources, spectrums of the light are non-uniform, and light of different colors (e.g. different wavelengths) have different intensities. In this particular example, three major intensity peaks centered respectively at the wavelengths of 440 nanometers (which coincidently lies within the blue color range), 550 nanometers (which coincidently lies within green color range), and 557 nanometers (which coincidently lies within the red color range).

It has been observed in the art that, human eyes have different sensitivity to colors. For example, human eyes are more sensitive to green and red colors but less in perceiving changes in blue colors. Given this phenomenon, particular colors can be sacrificed to improve other aspects of the illumination light, such as the brightness, or the temperature of the produced white color.

A typical perceptivity of viewer's eyes to the visible light is plotted in the dashed line in the figure. The product of the perceptivity and the spectrum is represented by the open-circles in the figure, and has a peak centered at 554 nanometers which coincidently overlap with the intensity peaks at 550 and 557 nanometers. In accordance with an embodiment of the invention, the color rendering segment of the color wheel is coated with a waveband filter that passes light of a particular wavelengths defined based upon the production curve of the spectrum of the a light source and perceptivity of viewer's eyes. An advantage of employing such waveband filter is that the white point produced by the illumination system (including the light source and the color wheel) can be moved to the desired white point in the CIE chart, while having minimal impact on the resulted luminance. In selecting the passing band of a waveband filter, it is preferred that the waveband filter passes at least the light of wavelengths in the range covered by the peak of the production of the spectrum and perceptivity. Examples of waveband filters are demonstrated in FIG. 11.

Figure 11:
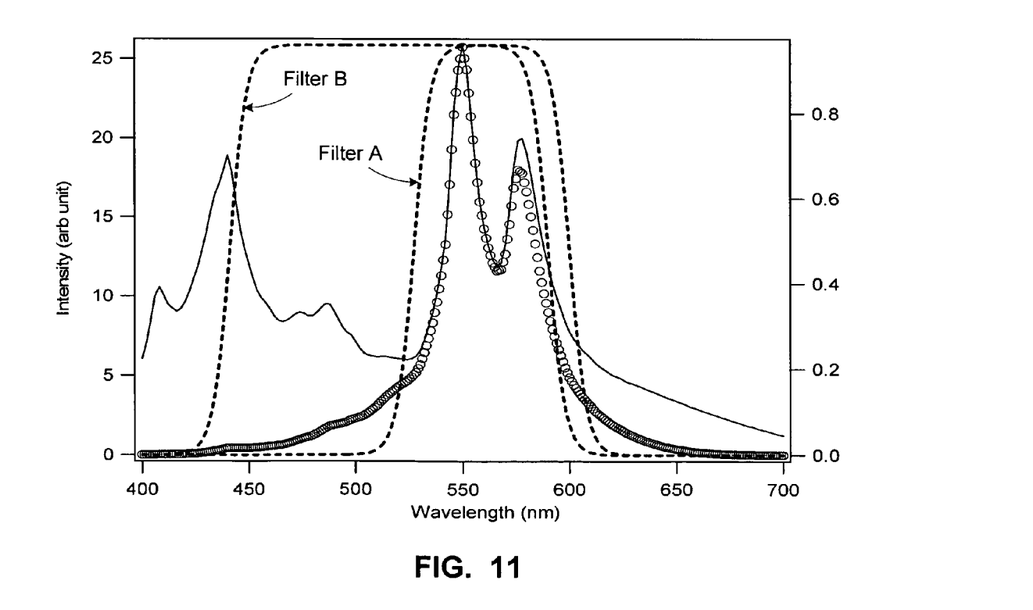
FIG. 11 demonstratively illustrates an exemplary method of determining the waveband threshold for the color rendering filter in FIG. 4 based on the spectrum of light and the sensitivity of viewer's eyes according to yet another embodiment of the invention.

Referring to FIG. 11, filter A is defined such that light with the wavelengths in the range from 500 to 600 nanometers can pass through the color rendering segment, while other light are filtered (e.g. through reflecting or absorption). The 500 and 600 nanometers are often referred to as waveband thresholds, more particularly, as low waveband and high waveband thresholds, respectively. By applying a proper threshold, such as 0.0017 to a function of the sensitivity of the viewer's eyes and the spectrum of the light from the given light source, the color of the color rendering segment can be determined. Such determined color of the color rendering segment is non-white (e.g. the chromaticity of the color is outside white zone 118 in FIG. 5A) and the chromaticity of which lies within a triangle spanned by the given primary colors red, green, and blue (e.g. triangle 116 in FIG. 5A).

A color wheel having a color rendering segment with such defined waveband filter, in addition to the primary color segments has many benefits. For example, white points produced by many color wheels in the art are often off-white. And when a red-push is required to correct skin-tones for high temperature whites. The color rendering segment having the above discussed property is able to move the white point produced by the illumination system including the light source and color wheel away from the white point produced by a color wheel otherwise, and towards a better white point in the CIE chart that has a higher brightness and/or whiteness. The waveband filter can also be selected such that minimum energy of the illumination light is blocked, while still achieving the desired color rendering.

The waveband thresholds can be set to other values, such as those in filter B shown in the figure. The waveband thresholds for filter B are respectively 424 and 605 nanometers. With such thresholds, light with wavelengths between 424 and 605 are allowed to pass the color rendering segment, and other light are blocked.

In other embodiments of the invention, a low-pass or high-pass can be selected for the color rendering filters depending upon the color a user intends to achieve with minimum energy of the illumination light being blocked. For example, when a bluish cast is desired, a low-pass threshold (e.g. at the 615 nanometers) can be established accordingly. As a result, light with wavelengths lower than the low-pass threshold (e.g. $\leq 615$ nanometers) are passed through the color rendering segment, while light with wavelengths longer than the low-pass threshold ($\geq 615$ nanometers) will be blocked by the color rendering segment. For another example, when a redish cast is desired, a high-pass threshold (e.g. at the 444 nanometers) can be established accordingly. As a result, light with wavelengths higher than the high-pass threshold (e.g. $\geq 444$ nanometers) are passed through the color rendering segment, while light with wavelengths shorter than the high-pass threshold ($\geq 444$ nanometers) will be blocked by the color rendering segment.

In fact, the same or similar method can be applied for the primary colors of the primary color segments in the color wheel. For example, the color of the color rendering segment can be selected such that it blocks the minimum energy of the light form source, while introducing the desired color shift. A method to achieve this goal is to derive the wavelength filter from the product of the spectrum of the light from the light source and a response of viewer's eyes to the light in the visible light range. The response of the viewer's eyes to the visible light can be described in many models, such as a perceptive brightness model derived from the LMS cone Response, an exemplar of which (after Boynton, 1979, based on Smith and Pokorny, 1975) is shown in the appendix A of the current application, and another example of which being derived from the Photopic and Scotopic Luminous efficacy is attached in appendix B of the current application.

By properly defining the threshold(s) of the waveband filter, different properties of the illumination light passing through the spinning color wheel and impinging the pixels of the spatial light modulator can be achieved, such as white colors of different temperatures, brightness, and/or whiteness.

In the following, exemplary implementations of the embodiments in the invention will be discussed. As a first example, chromaticity of the light emanated from the light source is inspected. In particular, chromaticity deficiencies of such light are identified. This can be achieved using many different methods, such as using a embedded photodetector, as set forth in U.S. patent application Ser. No. 10/751,145 to Richards, filed Jan. 2, 2004, the subject matter being incorporated herein by reference.

If it is detected that the light from the light source is deficient in red and blue (or any other color or combinations of colors), then rather than (or in addition to) providing a longer red segment in the color wheel as used in prior art, the color rendering segment that is purple or magenta in the present example, is provided for compensating such deficiencies in the light from the light source. The amount of red or blue in the purple or magenta segment is variable depending upon the amount of red and blue deficiency in the light from the light source. Or, if only red is deficient in light from the light source, then the fourth segment is a red segment. Alternatively, if red and green are deficient, two color rendering segments can be provided for the color wheel—one red, one green. A wide variety of number and color of the color rendering segments can be provided—such as from one to three color rendering segments for each set of red, green and blue segments—though if two sets of red, green and blue are provided on a color wheel, the color rendering segment(s) can be provided twice for each set of red, green and blue, or one segment—e.g. a red (or purple, magenta etc) segment for the whole color wheel. Regardless of the number or exact color of the color rendering segments in the color wheel, the primary red, green, and blue segments may not be altered in length—thus improving the ease in addressing the micromirrors. As different lamps are developed and used in the projection systems, the addressing of the spatial light modulator need not be changed to correspond to constantly varying color wheel segment lengths.

It is also possible to use the color rendering segment to enhance the brightness. Projection systems with higher lumens are often desirable for business presentation applications. Therefore, color wheels in such projectors often have a clear ("white") segment that passes unfiltered light from the light source to increase the overall brightness of the projected image. In the present invention, such a clear segment can be modified so as to compensate for the imbalance in the color source. As an example, if a light source is primarily deficient in light in the red spectrum, the white segment is modified so as to be a brightness enhancing segment with preferential transmission in red regions of the visible spectrum—essentially a pink segment. Likewise, if blue (or green) is the deficient color, the additional segment is light blue or light green—a color that corresponds to the deficiency in the light source and that is less saturated than the primary red, green and blue segments. Likewise, if the light source is deficient in more than one color, taking again the example where the light source is deficient in red and blue, the brightness enhancing segment is a less saturated "light purple" or "light magenta" color. In a further variation, a clear segment could be used in addition to the colored brightness enhancing segment. Color segments can be used in accordance with the present invention, depending upon the light source, including different shades of orange and yellow (depending upon the amount of deficiency in the red and green spectra of the light source), different shades of magenta and purple (depending upon the amount of deficiency in the red and blue spectra of the light source), and different shades of cyan or aqua (depending upon the amount of deficiency in the blue and green spectra of the light source)—which colors can be saturated if additional brightness is not desired, or unsaturated lightly colored segments—including colors sufficiently unsaturated so as to lie within the red-green-blue color gamut of the color wheel and thus not expand the color gamut, but rather color correct the light source and enhance the brightness of the display.

As another example, the color rendering segment is provided for enhancing the brightness of the display, while at the same time decreasing the amount of time the pixels are actuated for a color segment that is "over weighted" in the spectrum of the light source. For example, if a light source has the most green, slightly deficient blue, and more deficient red, equal color segments (red, green and blue) can be provided in the color wheel, with an additional brightness enhancing pink segment, and modulation of pixels for less than the whole time during the green segment. In this way, blue need not be added to the brightness enhancing segment, but instead, green is removed from the white point by modulating pixels for less than the entire possible time possible for the green segment (or segments if multiple color subframes are provided within the color wheel).

In implanting the embodiments of the invention for determining the color of the color rendering segment, chromaticity data, such as the chromaticity data describing the illumination light from the light source, the chromaticity data describing the colors of the selected primary colors of the primary color segments in the color wheel, and other chromaticity data, such as the CIE chart and the white zone defined by the DMV, can be stored in a storage medium, such as volatile or non-volatile memories, or a communication medium of preferably a computing device. Manipulation of these data, for example according to equations 1 to 3, can be performed using computer-executable instructions in a microprocessor or program modules. Generally, program modules include routines, objects, components, data structures and the like that perform particular tasks or implement particular abstract data types. The term "program" includes one or more program modules. When the embodiments of the present invention are implemented in such a unit, it is preferred that the unit communicates with the controller, takes corresponding actions to signals, such as actuation signals from the controller.

Figure 12:
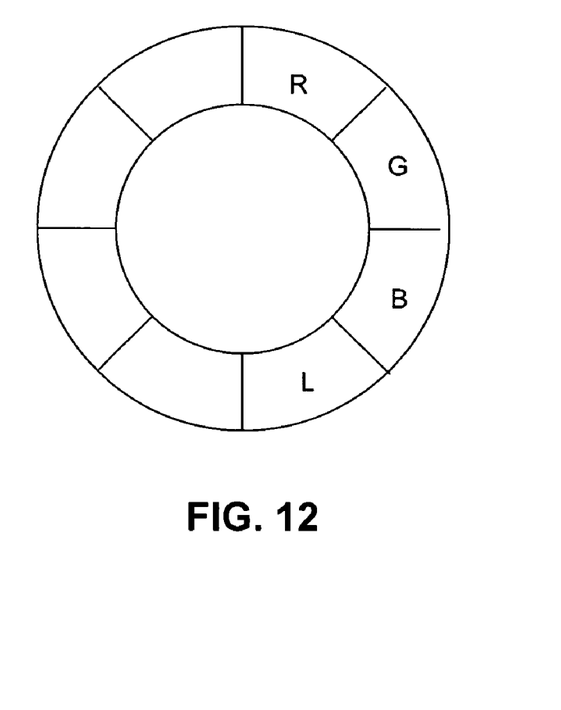
FIG. 12 illustrates another color wheel in which embodiment of the invention can b implemented.
Figure 13:
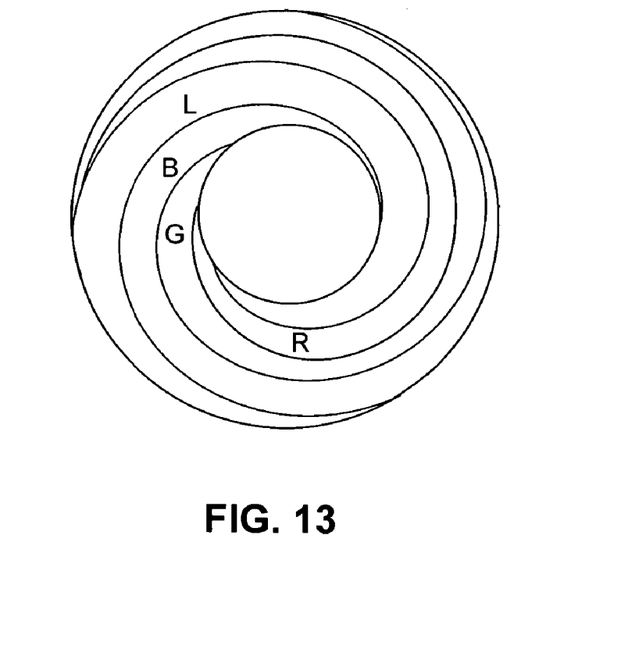
FIG. 13 illustrates yet another exemplar color wheel in which embodiments of the invention can be implemented.

In addition to the color wheel illustrated in FIG. 4, embodiments of the present invention can also be implemented in other type of color filters, such as those shown in FIGS. 12 and 13. Referring to FIG. 12, the color wheel comprises a plurality of segments. Each of the selected primary colors (e.g. standard or non-standard red, green and blue, or yellow, cyan, and magenta, or a combination thereof) is represented by more than one segment in the color wheel. Of the color segments, at least one of the segments is tinted with a color determined in a way discussed above.

FIG. 13 schematically illustrates another exemplary color wheel, the edges of the color segments are formed into spiral curves, such family of color wheels is often referred to spiral color wheels. The color segments between the spiral curves have different primary colors, such as the standard or non-standard red, green and blue, or yellow, cyan, and magenta, or a combination thereof, and at least one of the segments is a color rendering segment and tinted with a color using a method as discussed above.

The color wheel embodies the invention has a verity of display applications as shown in FIG. 3. Such a color wheel is particularly useful in display systems employing micromirror-based spatial light modulators, as shown in FIG. 14.

Figure 14:
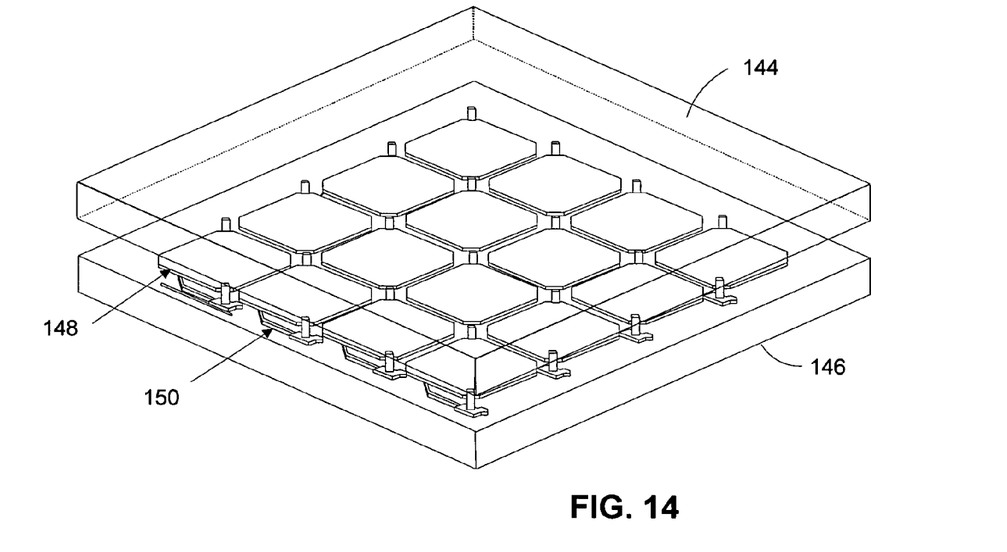
FIG. 14 illustrates a portion of a spatial light modulator in 3, wherein the spatial light modulator comprises an array of deflectable reflective micromirrors.

Referring to FIG. 14, a portion of an exemplary micromirror-based spatial light modulator is illustrated therein. For simplicity and demonstration purposes, only 4×4 micromirrors are presented. In general, the micromirror array may have millions of micromirrors, especially in display systems. For example, micromirror array 148 may have 1024×1768, or 1280×1024, or 1600×1024 or even larger numbers of micromirrors. In this particular example, the micromirrors are formed on light transmissive substrate 144, such as quarts or glass. For individually addressing and deflecting the micromirrors, electrode array 150 is provided and associated with the micromirror array. The electrodes are formed on semiconductor substrate 146, which is positioned proximate to substrate 144. Other than forming the micromirrors and electrodes on separate substrates (e.g., substrates 144 and 146), they can be formed on the same substrate, such as a standard semiconductor substrate on which integrated circuits can be fabricated. Alternatively, the micromirror substrate can be formed on a transfer substrate that is light transmissive. Specifically, the micromirror plate can be formed on the transfer substrate and then the micromirror substrate along with the transfer substrate is attached to another substrate such as a light transmissive substrate followed by removal of the transfer substrate and patterning of the micromirror substrate to form the micromirror.

Figure 15:
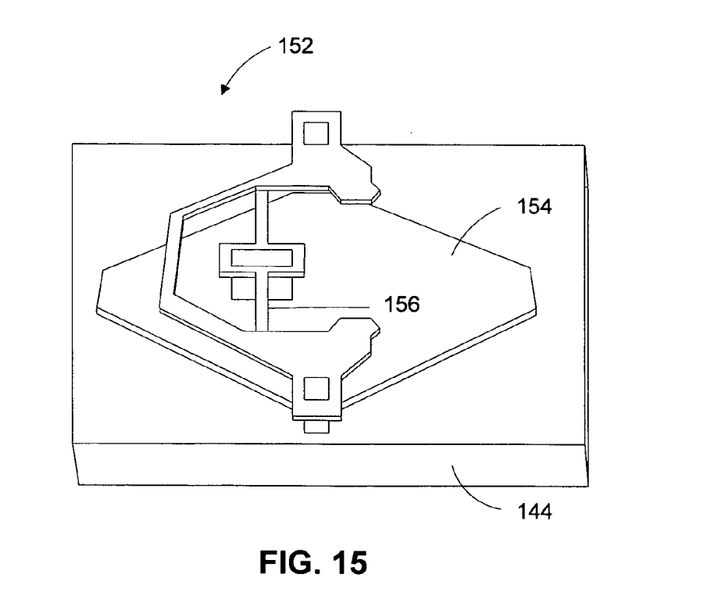
FIG. 15 illustrates an exemplary micromirror of the micromirror array in FIG. 14.

An exploded view of a micromirror in the spatial light modulator in FIG. 14 is demonstratively illustrated in FIG. 15. Referring to FIG. 15, micromirror 152 comprises deflectable reflective mirror plate 154 that is attached to deformable hinge (e.g. torsion hinge) 156 such that the mirror plate is operable to rotate along a rotation axis. The hinge is held on substrate 144 by other structures, such as hinge support and posts.

In this particular configuration, the mirror plate is attached to the hinge such that the rotation axis of the mirror plate is parallel to but offset from a diagonal of the mirror plate when viewed from the top. This can be achieved by placing the attachment point of the mirror plate to the hinge at a location not at the center of the mirror plate. As a result, the mirror plate can rotate to a larger angle in one direction than in the other. Such asymmetric rotation may benefit improvement in contrast ratio of the displayed images. The micromirror of course may take other suitable configurations, which will not be disclosed herein.

In operation, the color wheel spins at (or higher than) a particular angular speed such that the viewer's eyes integrate the separated colors without being able to perceive the time interval therebetween. Image data (e.g. bitplane data) corresponding to particular colors in a time slot during which the pixels of the spatial light modulator are illuminated by the particular colors are loaded into the spatial light modulator; and the pixels are set to the corresponding states (e.g. the ON or OFF states) based on the loaded image data. Adoption of such modulation procedure in a color wheel having a non-primary color segment may cause color distortion in the displayed images. To avoid this color distortion problem, light modulation during the time slots of the color rendering segment is performed in a way such that, the usage of the primary color segments R, G, and B is maximized, whereas the modulation of the color from the color rendering segment is allocated for only the colors that cannot be achieved with the R, G, and B segments. An exemplary modulation process to achieve a desired color in an image pixel will be discussed in the following.

At a color boosting time slot (the time interval when the color rendering segment is illuminated by the light from the light source), a desired color of the image pixel is received. The desired color of the image pixel can be expressed as $C=I_R R+I_G G+I_B B$, wherein $I_R$, $I_G$, and $I_B$ are the intensities of the primary colors corresponding to the primary color segments R, G, and B in the color wheel. The color of the color rendering segment L in the color wheel is $(1/r_0, 1/g_0, 1/b_0)$ as being calculated in equation 2. In the color boosting time slot, components for displaying the color of the color rendering segment L (the boosting color) is then calculated based on the given colors of the segments L, R, G, and B in the color wheel. Specifically, the components of the boosting color represented by R', G', and B' can be calculated by the following equations:

$$I'_R = \frac{k_r \times I_R - I_L}{r_0} \quad \text{(Eq. 3)}$$

$$I'_G = \frac{k_g \times I_G - I_L}{g_0}$$

$$I'_B = \frac{k_b \times I_B - I_L}{b_0}$$

$$I_L = \text{Max}[(k_r \times I_R - r_0), (k_g \times I_G - g_0), (k_b \times I_B - b_0)]$$

wherein $I_L$ is the luminosity of the color rendering segment; and $k_r$, $k_g$, and $k_b$ are the independent boosting factors for the primary colors.

As a numerical example, assuming that a color wheel has R, G, and B primary color segments, and a color rendering segment L that is defined as L=(200,255,80), and the color of an image pixel in a desired image is (R, G, B)=(128,186, 60), then the color components for the color boosting time slots can be individually determined as follows. The red component in the L can be $$128 - 80 \times \frac{200}{256};$$

the green component in L can be $$186 - 80 \times \frac{255}{256};$$

while the blue component can be $$60 - 80 \times \frac{80}{256}.$$

Given the calculated components, each of the primary colors is independently boosted accordingly.

It will be appreciated by those of skill in the art that a new and useful method and a device for improving the illumination of the pixels in spatial light modulators of display systems have been described herein. In view of the many possible embodiments to which the principles of this invention may be applied, however, it should be recognized that the embodiments described herein with respect to the drawing figures are meant to be illustrative only and should not be taken as limiting the scope of invention. Those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

We claim:

1. An illumination system for use in a projection system, comprising:
    a light source producing light;
    a set of primary color filters producing a red, green, and blue color, each having a chromaticity coordinate in a chromaticity diagram; and
    a color rendering filter having a color whose chromaticity lies within a triangle zone in the chromaticity diagram, the triangle zone having a set of corner points defined by the chromaticity coordinates of the red, green, and blue primary colors but outside a white zone having corners with chromaticity coordinates of (0.355, 0.355); (0.305, 0.305); (0.285, 0.325); and (0.335, 0.375).

2. The system of claim 1, wherein the red color lies within a zone defined by a set of corner points with coordinates of (0.48, 0.42), (0.568, 0.265), (0.735, 0.265), (0.545, 0.45), and (0.48, 0.42); wherein the green color lies within a zone defined by a set of corner points with coordinates (0.026, 0.399), (0.166, 0.364), (0.379, 0.494), (0.389, 0.607), (0.273, 0.719), and (0.026, 0.399); and wherein the blue color lies within a zone defined by a set of corner points with coordinates (0.078, 0.171), (0.15, 0.22), (0.25, 0.146), (0.169, 0.002), (0.12, 0.058), and (0.078, 0.171).

3. The system of claim 1, wherein the primary red, green, and blue colors have the chromaticity coordinates of (0.355, 0.355); (0.305, 0.305); (0.285, 0.325), respectively.

4. The system of claim 1, wherein the light source is an arc lamp.

5. The system of claim 1, further comprising a color wheel having the set of primary color filters and the color rendering filter.

6. The system of claim 1, wherein the primary colors comprise yellow, cyan, and magenta.

7. The system of claim 1, further comprising: a light pipe.

8. The system of claim 7, wherein the light pipe is positioned between the light source and the color wheel.

9. The system of claim 7, wherein the light pipe is positioned after the light pipe at the propagation path of the light from the light source.

10. The system of claim 1, wherein the primary color segments are operable to produce a first white color within the white zone; and the primary color segments and the color rendering segment in together are operable to produce a second white color within the white zone; wherein the first and second white colors are spaced as far away as the white allowing.

11. The system of claim 1, wherein the color of the color rendering segment lies within a triangle zone YNO in the CIE chromaticity chart, wherein N is a color of the light from the light source; wherein Y is a color produced by the light from the light source passing through 100% and 80% of the green and red filter, respectively; and wherein O is the color produced by the light from the light source passing through the 90% of the green segment and 100% of the red segment.

12. The system of claim 11, wherein point N has coordinates of (0.296, 0.322) in the CIE chromaticity chart.

13. The system of claim 1, wherein the color of the color rendering segment lies within a triangle zone of NCA in the CIE chart, wherein N is a color of the light from the light source; wherein C is a color produced by the color from the light source passing 100%, 60%, and 0% of the green, blue, and red segment, respectively; and wherein A is a color produced by passing the light from the light source through 92% of the green segment and 100% of the blue segment.

14. The system of claim 13, wherein point N has coordinates of (0.296, 0.322) in the CIE chromaticity chart.

15. The system of claim 1, wherein the color of the color rendering segment lies within a hexagon zone $G_2 Y_2 R_2 M_2 B_2 C_2$ in the chromaticity diagram, wherein $G_2$ is the color produced by the white light from the light source shining through 100% of the green segment, 25% of the Red segment, and 25% of the Blue segment; wherein $Y_2$ is the color produced by the white light from the light source shining through 100%, 25% and 25% of the Green, the Red, and the Blue segment, respectively; wherein $R_2$ is the color produced by the white light from the light source shining through 25%, 100%, and 25% of the Green, the Red, and the Blue segment, respectively; wherein $M_2$ is the color produced by the white light from the light source shining through 25%, 100%, and 100% of the Green, the Red, and the Blue segment, respectively; wherein $B_2$ is the color produced by the white light from the light source shining through 25%, 25%, and 100% of the Green, the Red, and the Blue segment, respectively; and wherein $C_2$ is the color produced by the white light from the light source shining through 100%, 25%, and 100% of the Green, the Red, and the Blue segment, respectively.

16. An illumination system for use in a projection system, comprising:
a light source producing light;
a set of primary color filters producing red, green, and blue illumination; and
a color rendering filter having a color that lies within a sector between a line $NC_1$ and a line $NC_2$ in a chromaticity diagram but outside a white zone having corners with chromaticity coordinates of (0.355, 0.355); (0.305, 0.305); (0.285, 0.325); and (0.335, 0.375), and with exclusion of the colors belonging to a zone having corners of (0.368, 0.539), (0.421, 0.486), (0.460, 0.540); and (0.387, 0.610), wherein N is the color of light from the light source; and $C_1$ corresponds to a color of light from a light source with a wavelength proximate to 610 nanometers, while $C_2$ corresponds to a color of light from a light source with a wavelength proximate to 546 nanometers.

17. The system of claim 16, wherein the $C_1$ and $C_2$ have coordinates in the chromaticity diagram of (0.666, 0.334) and (0.237, 0.718), respectively.

18. The system of claim 16, wherein the color of the color rendering filter has the chromaticity coordinates in the CIE chart of (x, y); and wherein x, y satisfy:

$$y > 0.0313 \cdot x + 0.313 \text{ AND } y < -17.096 \cdot x + 5.384.$$

19. The system of claim 16, wherein point N has the coordinates of (0.296, 0.322) in the CIE chromaticity chart.

20. The system of claim 16, wherein the color rendering segment has a color that lies within a zone with the corners having the coordinates of (0.565, 0.346), (0.735, 0.265), (0.648, 0.351), and (0.421, 0.486).

21. The system of claim 16, wherein the color rendering segment has a color that lies within a zone with the corners having the coordinates of (0.286, 0.446), (0.207, 0.771), (0.368, 0.539), and (0.387, 0.610).

22. The system of claim 16, wherein the color rendering segment has a color that lies within a zone with the corners having the coordinates of (0.210, 0.16), (0.15, 0.22), (0.166, 0.364), and (0.286, 0.446).

23. An illumination system for use in a projection system, comprising:
a light source producing light;
a set of primary color filters producing red, green, and blue illumination; and
a color rendering filter having a color that lies within a sector between a line $NA_1$ and a line $NA_2$ in a chromaticity chart but outside a white zone having corners with coordinates (0.355, 0.355); (0.305, 0.305); (0.285, 0.325); and (0.335, 0.375), and with exclusion of a zone having corners with chromaticity of (0.15, 0.22), (0.21, 0.16), (0.286, 0.446), (0.166, 0.364), and (0.15, 0.22), wherein N is the color of light from the light source; and $A_1$ corresponds to a color of light from a light source with a wavelength proximate to 560 nanometers, while $A_2$ corresponds to a color of light from a light source with a wavelength proximate to 430 nanometers.

24. The system of claim 23, wherein $A_1$ and $A_2$ have chromaticity coordinates of (0.373, 0.624) and (0.169, 0.007), respectively.

25. The system of claim 23, wherein point N has the coordinates of (0.296, 0.322) in the CIE chromaticity chart.

26. The system of claim 23, wherein the color of the color rendering filter has the chromaticity coordinates in the CIE chart of (x, y); and wherein x, y satisfy:

$y > 3.922 \cdot x - 0.839$ AND $y > 2.48 \cdot x - 0.412$.

27. The system of claim 23, wherein the color of the color rendering segment has a chromaticity coordinates that are not within a zone having corner points with chromaticity coordinates of (0.565, 0.346), (0.735, 0.265), (0.648, 0.351), and (0.421, 0.486).

28. The system of claim 23, wherein the color of the color rendering segment has a chromaticity coordinates that are not within a zone having corner points with chromaticity coordinates of (0.286, 0.446), (0.207, 0.771), (0.368, 0.539), and (0.387, 0.610).

29. An illumination system for use in a projection system, comprising:
- a light source producing light;
- a set of primary color filters producing a number of N primary colors; and
- a color rendering filter having a non-primary color that is different from the N primary colors, wherein said non-primary color is not white.

30. The system of claim 29, wherein the primary colors comprise red, green, and blue.

31. The system of claim 29, wherein the primary colors comprise yellow, cyan, and magenta.

32. The system of claim 29, wherein the white is a color within a white zone with the corner points having coordinates in the CIE chart of (0.355, 0.355); (0.305, 0.305); (0.285, 0.325); and (0.335, 0.375).

33. An illumination system for use in a display system, comprising:
- a light source producing light;
- a color wheel, further comprising:
  - a set of primary color segments producing primary colors of red, green, and blue; and
  - a color rendering segment, wherein the color rendering segment has a color that is determined based upon a product function that is proportional to a product of the luminance sensitivity of a viewer's eyes, a spectrum of the light from the light source and a predetermined wavelength threshold of the product function.

34. The system of claim 33, wherein the predetermined wavelength threshold has such a value that a resulted color from the illumination system is outside a white zone in the CIE chart, wherein the white zone has corners with coordinates of (0.355, 0.355); (0.305, 0.305); (0.285, 0.325); and (0.335, 0.375).

35. The system of claim 33, wherein the threshold has a value of 0.0017.

* * * * *